INVENTORS
ERNEST G. TIEGEL
BY RALPH G. TIEGEL
Schapp & Hatch
ATTORNEYS

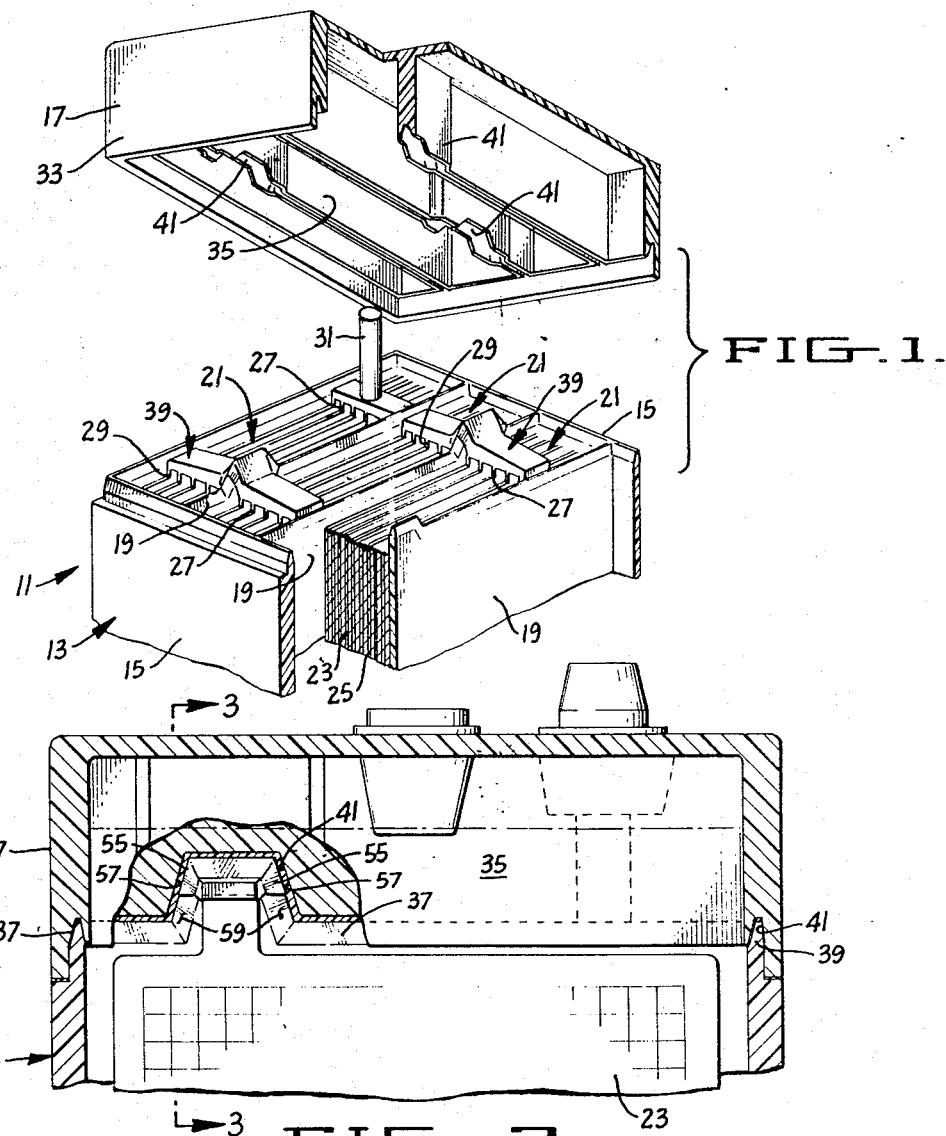

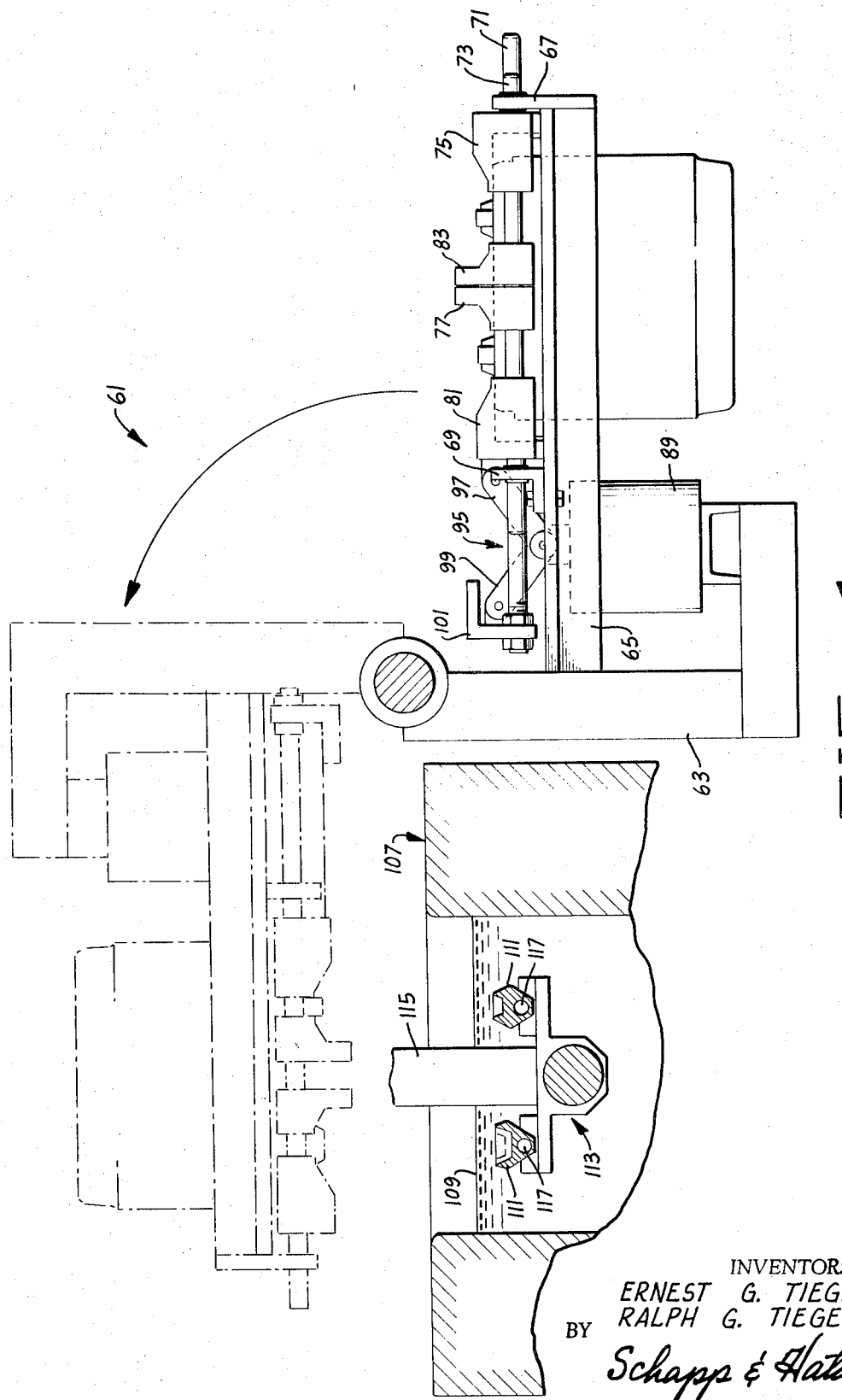

INVENTORS
ERNEST G. TIEGEL
RALPH G. TIEGEL
BY
Schapp & Hatch
ATTORNEYS

United States Patent Office 3,579,386
Patented May 18, 1971

3,579,386
INTERCELL CONNECTORS IN BATTERIES AND METHOD OF FORMING SAME
Ernest G. Tiegel, Redwood City, and Ralph G. Tiegel, San Carlos, Calif., assignors to Tiegel Manufacturing Co., Belmont, Calif.
Filed Oct. 22, 1965, Ser. No. 501,037
Int. Cl. H01m 13/10
U.S. Cl. 136—134
16 Claims

ABSTRACT OF THE DISCLOSURE

Leakproof electric stroage battery intercell connectors passing through the cell divider wall, and method and apparatus for forming such connectors by a cast-on process while the plates are in place in the cells of the battery. The connector is slotted in its lower surface to mate with the upper surface of the divider wall and ridged on its upper surface to mate with a corresponding recess in the battery cover, which extends down to a partline approximately at the level of the tops of the plates. The connector is thickened throughout the portion bridging the divider wall by being tapered laterally outwardly, and is sealed to the divider wall and depending portions of the cover by cementing material, which may be thermoplastic. Alternate forms are shown having a plurality of ridges and grooves in the upper and lower surfaces of the connector. The molding apparatus grips and inverts the battery case with the plates in place and then elevates a mold filled with molten lead into contact with the lugs of the plates to cast the connector onto the lugs and soften the cementing material. The mold is then chilled by fluid passing through an internal passageway and lowered away from the finished connector.

---

This invention relates to connectors for joining battery plates and methods and apparatus for forming such connectors, and more particularly to the provision of a leakproof connection between the battery plates of one cell of a storage battery and the battery plates in an adjacent cell of the battery.

In the manufacture of electrical storage batteries such as the lead-acid batteries commonly used in the automotive field, groups or stacks of battery plates and separators are contained in separate cells in the battery case. It is necessary to provide an electrical connection between all of the plates of one sign, such as positive, of one cell with all of the plates of the other sign, such as negative, in the adjacent cell. This may be accomplished by securing lead straps to lugs which project upwardly from the battery plates in each cell. The straps are then connected together either through or over a divider which separates one cell from another.

However, the acid or electrolyte used in the cells rises to a level above the upper ends of the connector lugs and the electrolyte in one cell should be prevented from leaking into the adjacent cell. Accordingly, any connection between the lugs of one set of plates in one battery cell and the lugs of another set of plates in an adjacent battery cell should be made leakproof.

Previous attempts to overcome the problem of maintaining an electrical connection between the plates of one cell and the plates of an adjacent cell while at the same time keeping the cells leakproof have not proved to be altogether successful. For example, one method of joining the plates of one cell with the plates in an adjacent cell is to provide a strap which extends upwardly above the level of the electrolyte, over the partition, and then down to the plates in the adjacent cell. This type of strap has to be rather long and has considerable electrical resistance. Moreover, if the battery using straps of this type is tipped, there is a possibility that the electrolyte in one cell will be transferred to the electrolyte in the adjacent cell.

Another type of connection made between the plates of one cell and the plates of an adjacent cell comprises two straps, one for each cell, which extend through a hole in a cell divider below the level of the electrolyte and which are connected together through the hole. It is quite difficult to provide a leakproof connection with this type of arrangement.

Furthermore, the straps used for joining the plates of one cell with the plates of another cell in the past have usually been attached to the connector lugs by a lead burning operation. While this type of attachment is generally satisfactory, it is rather expensive because of the multiplicity of operations involved in first casting the particular strap and thereafter burning each connector lug onto the strap.

The present invention contemplates a connector for joining the plates of adjacent cells of a storage battery and apparatus for and a method of forming such a connector which overcome the foregoing difficulties by the use of a novel approach to such problems. Basically, this approach contemplates a molded connector strap joining the connector lugs of the plates in two adjacent cells of a battery directly onto the connector lugs and across a cell divider between the cells. The method of forming the strap basically includes the steps of forming the strap with a ridged or grooved central portion in alignment with the cell divider, and connecting a cover to the battery with the ridged or grooved portion of the strap mating with a portion of the cover.

It is a principal object of the present invention to provide a connector for joining the plates of adjacent cells of a storage battery and apparatus for and a method of forming such connector which prevents the leakage of electrolyte from one cell to the next after the strap has been attached and the cells filled with electrolyte above the level of the battery plates.

Another object of the invention is the provision of a connector strap of the type described which has a relatively low electrical resistance.

A still further object of the invention is the provision of apparatus for and a method of forming a leakproof connection between the plates of adjacent cells of a battery which will permit the battery to be tipped without the possibiliy of electrolyte leaking from one cell to the adjacent cell, and will not permit electric self-discharge of a cell caused by capillary leakage along the connection.

Another object of the present invention is the provision of a connector for joining the plates of adjacent cells of a battery such as described which is relatively inexpensive, yet effective in its operation in the battery.

A still further object of the present invention is the provision of a method of forming a leakproof connection between the plates of adjacent cells of a battery which is economical to perform, yet is quite effective in producing the leakproof connection.

Further objects and advantages of our invention will appear as the specification proceeds and the new and useful features of our connectors for joining battery plates and apparatus and methods of forming such connectors will be fully defined in the claims hereto attached.

In the accompanying drawings, in which several of various possible embodiments of the invention are illustrated,
FIG. 1 is a broken apart and expanded perspective view of a fragment of a battery having a connector of this invention installed thereon;
FIG. 2 is an enlarged vertical section taken through a battery having a connector of this invention installed thereon, certain parts being broken away for clarity;
FIG. 3 is a vertical section taken generally along line 3—3 of FIG. 2;

FIG. 4 is a view in elevation of apparatus of this invention and illustrates one step in the method of this invention;

Figure 5:
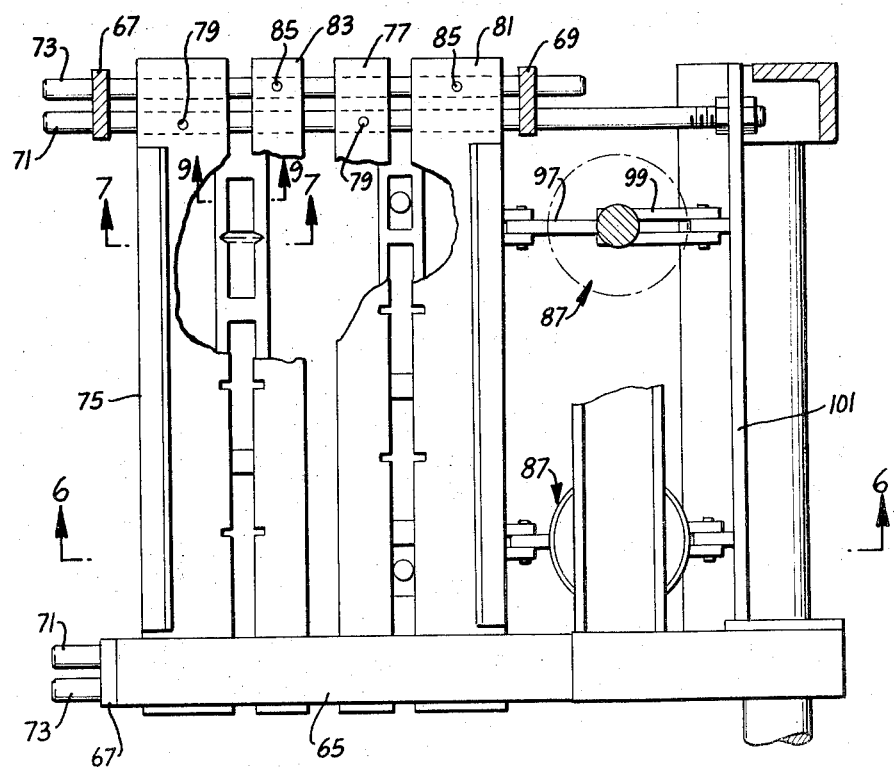
FIG. 5 is a plan view of the apparatus shown in FIG. 4, certain parts being removed.

Referring now more particularly to the drawings, a conventional storage battery is indicated at 11 and includes a base or case 13 having walls 15 and a cover 17. Base 13 includes a plurality of cell dividers 19 which divide the base into a plurality of cells or cell compartments 21. Groups or stacks of battery plates 23 are located in cells 21 and the negative plates are separated from the positive plates by separators 25. The negative plates in each cell have a plurality of connector lugs 27 thereon which extend upwardly at one end of the cell and the positive plates of the same cell likewise have a plurality of lugs 29 which extend upwardly at the other end of the cell. A terminal post 31 is connected to the plates at one corner of the battery and extends upwardly through a hole in the cover 17. Cover 17 includes depending skirts or walls 33 and dividing members 35 extending between opposing walls 33. The dividing members 35 are in alignment with the cell dividers 19. The upper edges of the cell dividers 19 and the walls 15 are tapered as indicated at 37 and, except for the area beneath the connector straps 39 of this invention, nest in grooves or recesses 41 in the dividing members 35 and walls 33 of the cover 17.

Strap 39 includes two arms 43 and 45 and a central portion 47. The arms 43 and 45 are connected to the lugs of plates in adjacent cells 21 of the battery 11. Central portion 47 is formed as a ridge or hump 49 which extends upwardly into the adjacent groove or recess 41 in the adjacent dividing member 35. A sealing compound or thermoplastic adhesive 51, such as an epoxy resin adhesive, is located in the groove 41 of the adjacent dividing member 35 and secures the strap 39 to the dividing member. The central portion 47 of strap 39 is also provided with a tapered groove or recess 53 which is nested over the tapered edge 37 of the cell divider 19 aligned therewith. Adhesive or a thermoplastic sealing compound may also be placed in the groove 53 and secures the strap 39 to the cell divider 19. The central portion 47 of the strap also has laterally extending ear portions 55 which nest in the sloping portions 57 of the adjacent groove 41. The tapered upper edges 37 of the cell dividers 19 are formed so that they become extensions 59 of the ears 55 and also nest in sloping portions 57 of grooves 41.

Figure 6:
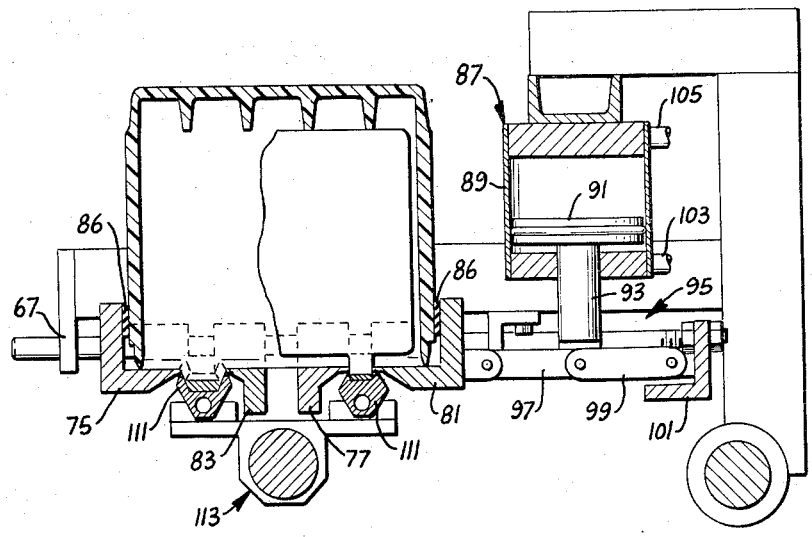
FIG. 6 is a vertical section taken along line 6—6 of FIG. 5.
Figure 7:
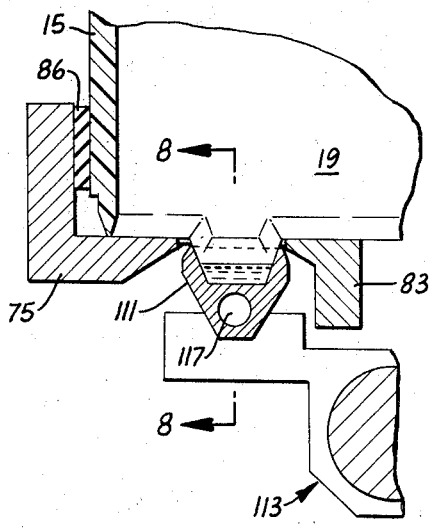
FIG. 7 is an enlarged fragmentary section of FIG. 5.
Figure 8:
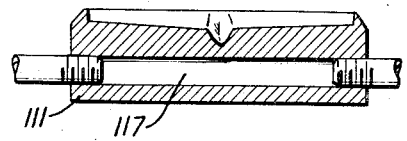
FIG. 8 is a section taken along line 8—8 of FIG. 7.
Figure 9:
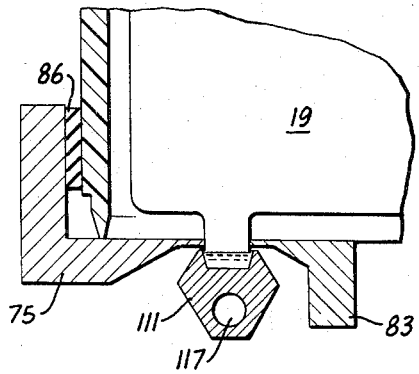
FIG. 9 is a section taken along line 9—9 of FIG. 5.
Figure 10:
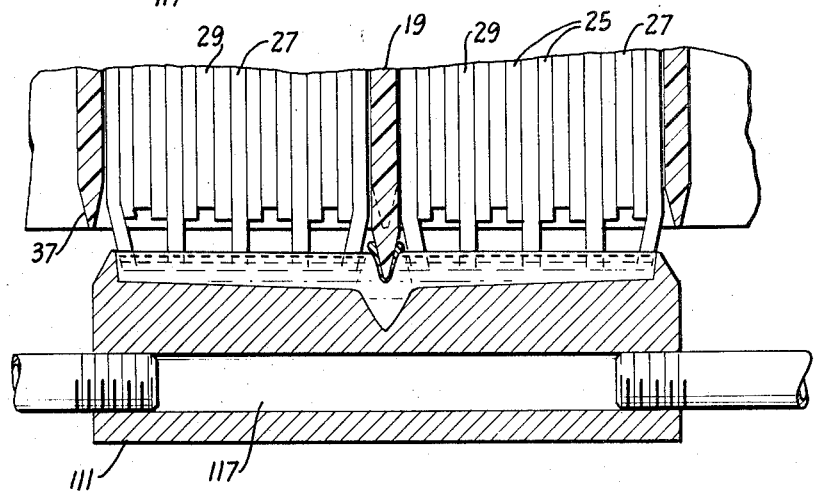
FIG. 10 is an enlarged section similar to FIG. 8.

The apparatus for forming the straps 39 is generally indicated at 61 in FIG. 4 and includes a pivot member 63. A pair of arms 65 extend laterally from member 63 and each arm 65 has support members 67 and 69 which slidably support a pair of rods 71 and 73. A battery clamp 75, also acting as one plate support, and a plate support 77, are connected to the rods 71, as indicated at 79, and another battery clamp 81, also acting as one plate support, and another plate support member 83, are connected as indicated at 85 to rods 73. Each of the battery clamps 75 and 81 has a soft pad 86, such as sponge rubber, thereon to prevent the battery case 13 from being damaged (see FIG. 6).

Rods 71 and 73 are movable in supports 67 and 69 by a pair of actuating mechanisms 87, each of which includes a cylinder 89 having a piston 91 slidable therein. A piston rod 93 is connected between each piston 91 and a toggle linkage 95 which comprises a first link 97 connected to battery clamp 81 and a second link 99 connected to a bar 101 joining rods 71. Air cylinder 89 is provided with ports 103 and 105 through which air is delivered from any conventional air source (not shown) for actuating the piston 91 between opposite ends of the cylinder 89. When the linkage 95 is in the position shown in FIG. 4, i.e., a broken position, the clamps 75 and 81 and the plate supports 77 and 83 are in the open or nonripping position. When the piston 91 is actuated to straighten the linkage 95, the rods 71 and 73 are moved in opposite directions to cause clamps 75 and 81 and plate supports 77 and 83 to grip the battery.

The apparatus 61 also includes a molten lead reservoir 107 for holding a supply 109 of molten lead. Individual mold means 111 are commonly connected to a reciprocable carrier 113 which is adapted to be moved up and down by means of a vertically reciprocable rod 115. Each of the mold means 111 is shaped to mold a strap 39 and includes a coolant passage 117 through which coolant passes to chill a strap in the mold.

The formation and connection of the straps 39 to the lugs on the battery plates and completion of the assembly of the battery 11 are as follows:

Initially, the battery case is placed under the apparatus 61 as shown in FIG. 4. The piston 91 of air cylinder 89 is then actuated to cause the toggle linkage 95 to straighten. This in turn causes the rods 71 and 73 to be moved in such manner that the clamps 75 and 81 and the plate supports 77 and 83 are moved from a nonengaging position to a position wherein the battery is securely held by the swingable apparatus. The arm 63 and the battery held by the clamps 75 and 81 and plate supports 77 and 83 are then swung around to the position shown in broken lines in FIG. 4. In this position, the battery is held so that the battery plate lugs 27 and 29 are aligned directly above the mold means 111. The carrier 113 and the associated mold means 111 are raised from the position shown in FIG. 4 to bring the mold means 111 up to the depending lugs 27 and 29 and the latter are dipped into the molten lead in the cavities in the mold means 111.

Prior to the immersion of the outer ends of the lugs 27 and 29 into the mold means 111, a thermoplastic sealing material, such as ordinary battery sealing compound, may be applied to the tapered edges 37 of the cell dividers 19 and the walls 15. The tapered edges 37 of the cell dividers 19 will be covered by the central portion 47 of the strap 39 and the sealing compound will aid in obtaining a proper seal between cells.

The dipping of the connector lugs into the molten lead already in the molds eliminates any problem of mechanical erosion which might occur if the connector lugs were positioned in the mold before the molten lead was added.

In accordance with the present invention, the mold is maintained at a temperature high enough to keep the lead in molten condition before and during the immersion of the lugs therein, and for a period of time sufficient to ensure optimum fusion and welding between the lugs and the resulting connector strap 39. This may be accomplished by utilizing the heat sink characteristic of the carrier 113 and mold means 111 to absorb enough heat from the molten metal contained in the reservoir during immersion of the mold therein. Thus, the temperature at which the molten lead in the reservoir is maintained determines the length of time in which the mold means will maintain the lead contained therein in the desired molten condition.

As soon as an optimum weld has been obtained, the mold means are each immediately chilled below the melting point of the lead by directing a stream of relatively low temperature fluid through the coolant passages 117.

Figure 11A:
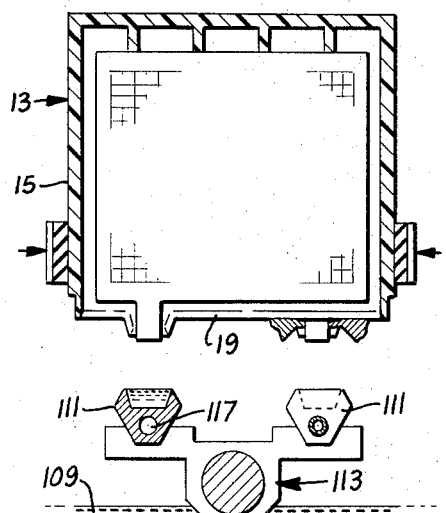
FIGS. 11A–11D illustrate the method of this invention.
Figure 11B:
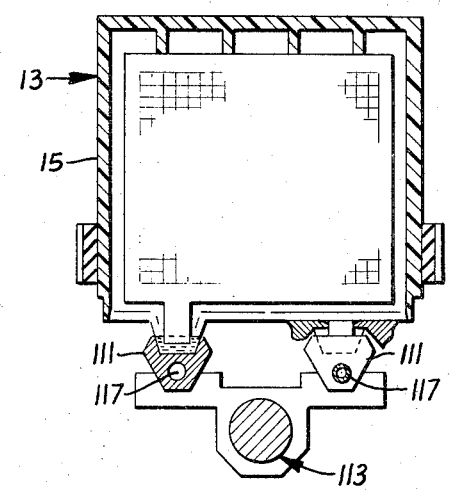
Figure 11C:
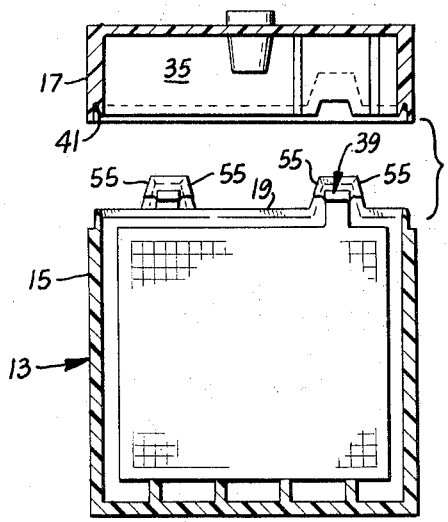
Figure 11D:
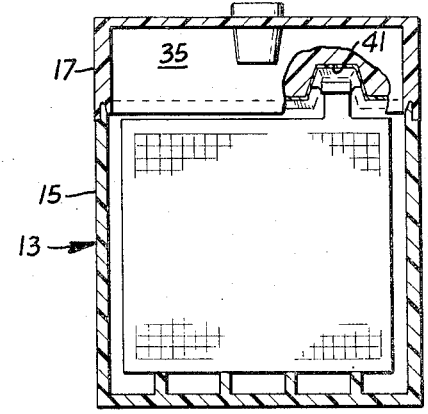

After the straps 39 have been formed and connected to the lugs 27 and 29 of the battery plate, the battery base or case 13 is turned to its correct right-side-up position as shown in FIG. 11C. Sealing material may then be applied to the mating grooves and tapered edges on the dividing members 35 and the cell dividers 19, as well as on the lateral ears 55 and the ridge 49 of each connector strap 39. The sealing material is also applied to the upstanding edges of the walls 15 of the case which are to mate with the grooves in the skirt portions of the cover 17. The cover is then placed down on the base 13 with the grooves 41 in the dividing members 35 and in the walls 33 of the cover 17 mating with the upper edges 37 of the cell dividers 19 and the walls 15 of the base, and with the aligned portions of the recesses 41 mating with the ridge or hump 49 on the associated strap 39.

After the cover 17 has been securely connected in place on the base 13, the individual cells may be filled with electrolyte above the level of the straps 39 since the electrolyte cannot leak through the connection made between the plates of the adjacent cells. It will be seen that the connector straps 39 are completely leakproof and, in addition, are relatively short so that they offer a low electrical resistance.

Figure 12:
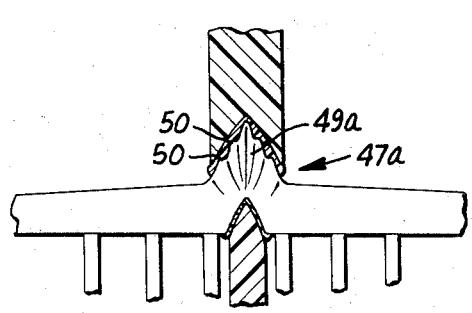
FIGS. 12 and 13 illustrate modifications of the connectors of the invention.

A strap 39 having a modified central portion 47a is illustrated in FIG. 12. The ridge or hump 49a of portion 47a is provided with a plurality of laterally extending serrations or corrugations 50 which substantially increase the length of the path which must be followed by any electrolyte tending to leak from one cell to the adjacent cell. The increased length of this path makes it highly improbable that any electrolyte will leak from one cell to the adjacent cell. While this serrated or corrugated central portion 47a increases the improbability that any electrolyte will leak from one cell to another, it will be noted that the central portion 47a maintains the same short and low resistance path as central portion 47.

Figure 13:
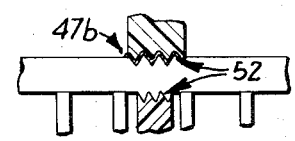

A further modification of the central portion 47 is illustrated in FIG. 13 at 47b. The central portion 47b is straight and does not have a ridge or hump therein, but does have a plurality of serrations or corrugations 52 which substantially increase the length of the path which electrolyte must follow if it were to leak from one cell to an adjacent cell. By using a sealing material, such as sealing material 51, the electrolyte is preventing from leaking from one cell to another, while the path along which current will flow from one cell to another is as short as possible. Accordingly, a low resistance is maintained, while at the same time electrolyte is prevented from flowing from one cell to another.

An additional advantage of the method of the present invention lies in the ability of the method to turn out many more of the connector straps 39 than previously known equipment. It will thus be seen that the method of the present invention provides a highly flexible and efficient mode of forming connector straps between plates of adjacent cells of a battery, with the connection between the plates being leakproof.

As various changes could be made in the above apparatus, methods and products without departing from the scope of the invention, it is intended that all matter contained in the above description or shown in the accompanying drawings shall be interpreted as illustrative and not in a limiting sense.

We claim:

1. A method of forming a leakproof connection across a cell divider of a battery between a plurality of plates of one cell and a plurality of plates in an adjacent cell of the battery, comprising the steps of placing sealing material along a portion of the outer edge of the cell divider, casting a strap onto plates of one cell and onto plates of the adjacent cell while the plates are in the cells, with the strap extending across the cell divider and formed in contact with the sealing material, applying sealing material to a surface portion of the cast strap and placing a cover over the two djacent cells with a dividing member in general vertical alignment with the cell divider and with the sealing material on the strap engaging the divider member to form a leakproof connection between the plates of the adjacent cells of the battery.

2. A method of forming a leakproof connection between the plates of adjacent cells of a battery, comprising the steps of molding a strap joining connector lugs of the plates in each cell while the plates are in place in the cells, with the straps extending across and being formed in adhered relation to a cell divider between the cells, forming a first mating portion on the exposed surface of the strap in alignment with the cell divider as the strap is formed, and connecting a cover to the battery with the first mating portion on the strap mating with a second mating portion in the cover.

3. A method as set forth in claim 2 wherein the step of connecting a cover to the battery includes applying adhesive on the first mating portion prior to placing the second mating portion in mating relation with the first portion.

4. A method as set forth in claim 2 wherein the step of forming the strap connected with the cell divider includes applying sealing material along the exposed edge of the cell divider.

5. A method of forming a leakproof connection between the plates of adjacent cells of a battery, comprising the steps of assembling said plates and placing them in the final intended location in adjacent cells of an open top battery casing, providing lead in an open top mold formed for providing lead battery straps extending between said cells and connected to certain of said plates, inverting the battery casing and plate assembly and bringing the lugs of said plates to be connected into contact with the molten lead, and casting the molten lead into a battery strap on said plates, said battery strap and said battery casing being formed to provide a sealing contact between the lower surface of the battery strap and the upper surface of the partition when the battery strap is cast, and placing a cover over said casing in sealing relation thereto for completing the individual cell closures.

6. A method as set forth in claim 5, in which the partition between cell walls has a raised portion having a length substantially the same as the width of the battery strap, and in which the strap is formed with its central portion having an enlarged width and an elevated tapered ridge overlying the raised portion of the partition and abutting the complete upper perimeter thereof.

7. A method as set forth in claim 6, in which the upper surface of the central portion of the strap is also formed with a plurality of recesses generally parallel to the ridge line, and which is sealed to the cover by adding an amount of plastic sealing material sufficient to completely fill said recesses and the space between the strap and the cover.

8. A method as set forth in claim 5 further comprising applying sealing material between the strap and a dividing member of a cover adapted to extend over two adjacent cells, and placing the cover over the two adjacent cells with the dividing member in general vertical alignment with the cell divider and with the material between the dividing member and the strap forming a leakproof connection between the plates of the adjacent cells of the battery.

9. A method as set forth in claim 5 further comprising applying epoxy resin material between the strap and a dividing member of a cover adapted to extend over two adjacent cells, and placing the cover over the two adjacent cells with the dividing member in general vertical alignment with the cell divider and with the material between the dividing member and the strap forming a leakproof connection between the plates of the adjacent cells of the battery.

10. A method as set forth in claim 5 further comprising placing sealing material along the exposed edge of the cell divider prior to casting said strap.

11. In a storage battery of the type having a case, a plurality of cells in the case separated by cell dividers, plates in each of the cells formed with connector lugs, connectors extending across the cell dividers and connected to connector lugs for joining plates of each cell with plates in an adjacent cell, a cover connected to the case and having a plurality of dividing members, one for each cell divider, extending downwardly toward the cell dividers and engaging the connectors to form a leakproof joint; the improvement comprising the case being formed with the upper edges thereof located below the upper surface of the connector lugs, the cell dividers each having a raised section on its upper edge where the connectors extend across the cell dividers, and each of the connectors having its central portion extending upwards to form a ridge, said ridge completely overlying the corresponding raised section of the cell divider, with the ridge also having depending skirts adjacent each upper end of the raised section to increase the strength of the leakproof seal and the electrical conductivity of the connector.

12. In a storage battery of the type having a case, a plurality of cells in the case separated by cell dividers, plates in each of the cells, connectors extending across the cell dividers and joining the plates in each cell with plates in the adjacent cells, a cover connected to the case and having a plurality of dividing members, one for each cell divider, extending downwardly toward the cell dividers and engaging the connectors to form a leakproof joint; the improvement comprising tapered edges on said cell dividers, said connectors having grooves in the lower sides thereof in which said tapered edges fit, each of said connectors having a tapered ridge on the upper side thereof, and each of said dividing members having a recess therein in which said tapered ridge fits for forming the leakproof joint each of said connectors having lateral extensions therefrom sloping downwardly and outwardly from the top of said tapered ridge, the upper edge of said lateral extensions being tapered to form sloping continuations of said tapered ridge, so that vertical sliding motion along mating surfaces is minimized.

13. In a storage battery as set forth in claim 12 wherein the improvement further comprises an adhesive between the upper edges of each of the cell dividers and the adjacent groove in the connector extending across the divider.

14. In a storage battery as set forth in claim 12 wherein the improvement further comprises an adhesive between the tapered ridge on each connector and the recess in the adjacent dividing member.

15. In a storage battery as set forth in claim 14 wherein the improvement further comprises adhesive between the upper edges of each of the cell dividers and the adjacent groove in the connector extending across the divider.

16. A storage battery as set forth in claim 12, wherein the connectors are also provided with a plurality of recesses generally parallel to the ridge line and located in the leakproof joint.

References Cited

UNITED STATES PATENTS

| | | | |
|---|---|---|---|
| 2,388,042 | 10/1945 | Daily | 136—170UX |
| 3,253,962 | 5/1966 | Deprill et al. | 136—134 |
| 3,309,232 | 4/1967 | Wilson | 136—134 |
| 1,425,924 | 8/1922 | Willard | 136—168X |
| 3,259,525 | 7/1966 | Wilson | 136—134X |
| 3,396,056 | 8/1968 | Gonnard | 136—134X |

FOREIGN PATENTS

| | | | |
|---|---|---|---|
| 969,087 | 9/1964 | Great Britain | 136—176 |
| 988,423 | 4/1965 | Great Britain | 136—134 |

DONALD L. WALTON, Primary Examiner

U.S. Cl. X.R.

136—170, 176